Oct. 28, 1941.      G. G. HAVENS      2,261,025

PNEUMATIC TIRE

Filed March 8, 1939

INVENTOR.
GLENN G. HAVENS
BY
ATTORNEYS.

Patented Oct. 28, 1941

2,261,025

UNITED STATES PATENT OFFICE 2,261,025

PNEUMATIC TIRE

Glenn G. Havens, Detroit, Mich., assignor to United States Rubber Company, New York, N. Y., a corporation of New Jersey Application March 8, 1939, Serial No. 260,516

2 Claims. (Cl. 152—209)

This invention relates to pneumatic tires and to the tread portion thereof, and in particular it relates to a pneumatic tire tread having improved tractive and antiskid characteristics.

In general, the invention comprises a pneumatic tire tread having rows of antiskid elements, and having diagonally disposed slits formed in circumferentially extending rows in at least some of the rows of antiskid elements.

This application relates to an improvement over the subject matter of my co-pending application, Serial No. 207,658, filed May 13, 1938.

The treads of pneumatic tires may be improved substantially in respect to traction and antiskid effect by the inclusion of slits in the tread, but care must be taken to avoid certain conditions such as tread cracking, tearing loose of tread portions, uneven tread wear, and objectionable noise.

In the practice of my invention, I provide, in combination with a tread having antiskid elements, a plurality of diagonally disposed slits spaced relatively close and extending in a single circumferentially extending row in each row of antiskid elements but excluding the outer rows of antiskid elements. By this arrangement of incorporated slits in the tire tread, successful riding qualities are obtained without undesirable wearing characteristics.

It is, therefore, among the objects of my invention to provide a pneumatic tire of the slit tread type in which traction and antiskid qualities are improved; in which cracking at the base of the slits is reduced; in which more uniformity of tread wearing characteristics is obtained; and in which objectionable noise is eliminated.

These and other objects and advantages will appear more fully in the following detailed description, when considered in connection with the accompanying drawing, in which.

Figure 1:
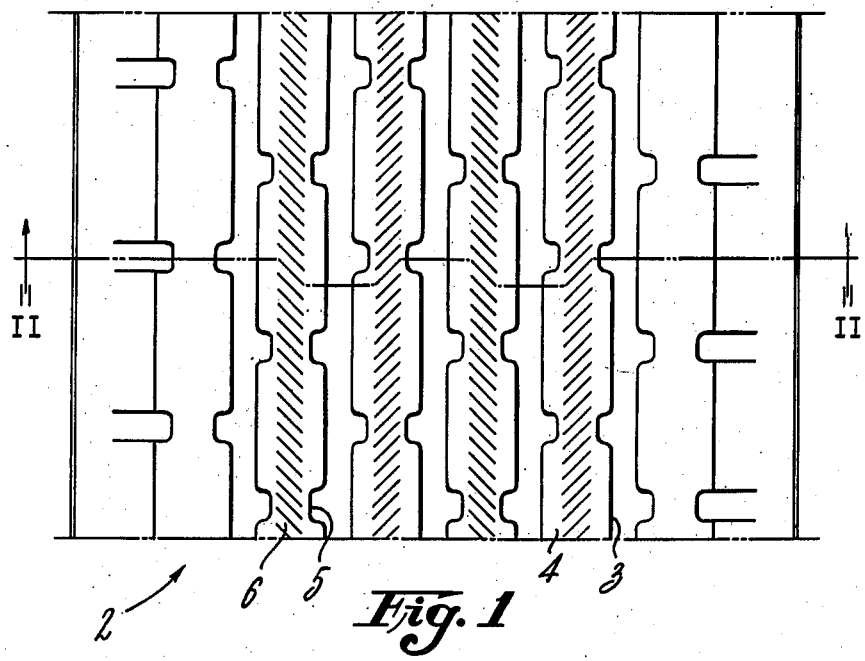
Fig. 1 is a plan view of the tread of a portion of a pneumatic tire, illustrating the application of the invention to a conventional tread configuration.

Referring to the drawing, I show a pneumatic tire comprising essentially a conventional carcass 1 of strain resisting elements and a rubber composition tread 2 having grooves 3 defining antiskid elements 4, illustrated in the form of circumferentially extending rows of connected tread blocks. The antiskid configuration may be of any conventional design. However, in accordance with current practice, it is preferable to utilize a design which at least in part conforms to substantially continuous circumferentially extending ribs. Notches 5 or other forms of indentation may extend into the ribs in order to provide a more rugged appearance to the tread. The preferred embodiment illustrates a 6.00-16 size tire tread having six rows of antiskid blocks, with connecting portions which form, with the blocks, substantially continuous ribs. The transverse block width is approximately $\frac{7}{8}$ inch, and the transverse width of the connecting portions is approximately $\frac{5}{16}$ inch. However, it is to be understood that the invention is equally applicable to various other combinations in the proportion and number of the rows of antiskid elements.

A multiplicity of isolated, rectilinear slits or incisions 6 are formed in at least some of the rows of antiskid elements. By isolated is meant unconnected with any other slit or groove so that each rectilinear slit is completely surrounded by rubber and in addition is isolated from all other slits. It is desirable to omit the slits from the outer or shoulder rows of antiskid elements, for the reason that the outer rows have less support from adjacent parts of the tire than the inner rows and consequently are subjected to greater operating strains. Thus, by decreasing the stability by applying slits to the inner rows of antiskid elements, a more uniform condition of stability is imparted to the entire road contacting surface of the tread.

The slits 6 are arranged in circumferentially extending rows equidistant from the circumferential edges of the antiskid elements and are about $\frac{1}{16}$ inch in width when measured transversely of the tire. Each slit is disposed in a diagonal plane relative to the trans-axial plane of the tire. Preferably this angular position of the slits is approximately 45 degrees when measured with relation to the circumferential edges of the antiskid elements. The diagonally disposed slits, because they avoid abrupt rolling contact with the road surface, aid in producing uniformity of tread wear, and, in combination with proper spacing, eliminate objectionable noise.

The diagonally formed slits are parallel with each other throughout each circumferentially extending row of slits. However, in adjacent rows of antiskid elements the diagonal slits are disposed in an opposite direction. Preferably, the slits should be so arranged that the number of rows of antiskid elements having slits extending in one direction should be equal to the number of rows of antiskid elements having slits extending in the opposite direction. The purpose of this balance of directional slit formation is to provide uniform traction and antiskid characteristics of the tire and to prevent any tendency of the tire to skid in a direction other than parallel with the trans-axial plane of the tire.

Because the slits are disposed diagonally, an advantage in both longitudinal and lateral skid resistance is obtained. Another advantage in forming the slits in a diagonal direction relative to the trans-axial plane of the tire is to permit an increased length of each slit, while at the same time maintaining a greater distance between the edges of the slit and the circumferential margins forming the wall of the antiskid elements.

Preferably, the length of the slits should be less than one-half the average width of the row of antiskid elements. By maintaining the length of the slits within this limitation, the slits are more applicable to various designs without any of the slits being formed through the sidewall of the antiskid elements. Also, the slits, being of relatively short length, are less susceptible of becoming enlarged through crack formations caused by insufficient support at the side edges of the slits.

The slits in each row are spaced relatively close to adjacent slits in the same row. By this arrangement, the slits overlap circumferentially of the tire and when the tire is in motion, the leading end of each slit comes in contact with the ground before the trailing end of the preceding slit has left the ground. The purpose of the close spacing, besides having increased traction and antiskid advantages, is to overcome objectionable noise. Various types of slitting produce a noise having a definite pitch. It has been found that, by spacing the slits relatively close, the pitch and intensity of the noise of the tire when in operation is not objectionable. However, when the slits are spaced too closely, they lose their structural stability, do not provide sufficient traction and antiskid characteristics, and frequently result in portions of the tread tearing out. By extensive tests I have found that the proper spacing of the slits when measured at right angles thereto should be approximately $\tfrac{1}{16}$ inch, or not more than $\tfrac{3}{32}$ inch.

Figure 2:
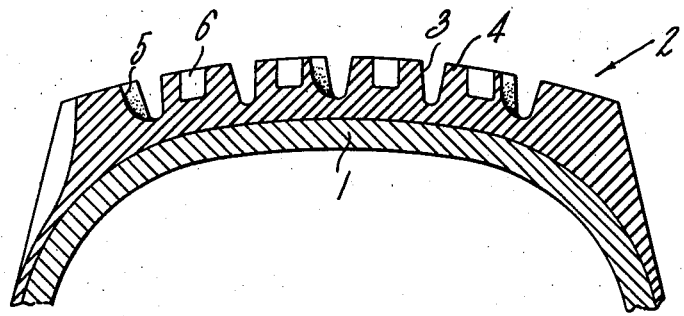
Fig. 2 is a portion of a transverse view thereof, taken on line II—II of Fig. 1.
Figure 3:
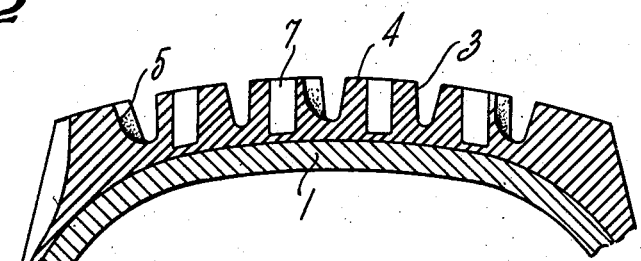
Fig. 3 is a view similar to Fig. 2, illustrating a modification of the invention in the form of variation in depth of slits.

As shown in Fig. 2 of the drawing, the depth of the slits 6 is equal to two-thirds of the height of the antiskid elements. Good results are obtained by the formation of slits of such depth. Because the slits are supported with a sufficient amount of rubber composition at the sides of the rows of slits, it is also possible to increase the depth of the slit to a point relatively close to the tire carcass 1. As shown in Fig. 3, slits 7 are formed in the tread 2 and have a preferred depth limitation, which depth is equal to the height of the antiskid elements plus one-half the distance between the base of the tread grooves and the top of the tire carcass.

In forming the slits in the tread it is intended that substantially none of the rubber composition be removed from the tread, and that the adjacent walls formed by the slits should be substantially in contact engagement with each other for the purpose of supporting the rubber composition laterally of the slits, particularly when the tire is subjected to operation strains.

As thus shown and described, I have provided a pneumatic tire tread having a novel arrangement of slits whereby substantial advantages in tractive and antiskid characteristics are obtained, in combination with substantially quiet operation, and without impairing the wearing quality of the tread or impairing the structural stability of the tire.

While I have shown and described a preferred embodiment of my invention, it is to be understood that it is susceptible to those modifications which appear obvious and which appear within the scope of the appended claims.

Having thus described my invention, what I claim and desire to protect by Letters Patent is:

1. A pneumatic tire having a rubber tread composed of a plurality of parallel and functionally continuous ribs of the same vulcanized rubber composition, said ribs being defined by a plurality of circumferentially extending grooves of substantial width and depth, the majority at least of said ribs being provided with a plurality of isolated, rectilinear slits extending diagonally thereof and terminating within the edges of the ribs to provide continuous marginal walls and overlapping circumferentially of the tire, whereby the slits are progressively brought into engagement with the ground during travel of the tire and the closed leading end of each slit comes into contact with the ground before the closed trailing end of the preceding adjacent slit leaves contact with the ground, the depth of said slits being at least substantially the depth of the grooves and the inclination of the slits in some of the inner ribs being opposite to that in adjacent ribs.

2. A pneumatic tire having a rubber tread composed of a plurality of parallel and functionally continuous ribs of the same vulcanized rubber composition, said ribs being defined by a plurality of circumferentially extending grooves of substantial width and depth, the inner ribs being provided with a plurality of isolated, rectilinear slits extending diagonally thereof and terminating within the edges of the ribs to provide continuous marginal walls and overlapping circumferentially of the tire, whereby the slits are progressively brought into engagement with the ground during travel of the tire and the closed leading end of each slit comes into contact with the ground before the closed trailing end of the preceding adjacent slit leaves contact with the ground, the depth of said slits being at least substantially the depth of the grooves and the inclination of the slits in some of the inner ribs being opposite to that in adjacent ribs.

GLENN G. HAVENS.